(12) United States Patent  
Black et al.

(10) Patent No.: US 9,218,338 B1  
(45) Date of Patent: *Dec. 22, 2015

(54) TEXT SUGGESTION

(71) Applicant: Google Inc., Mountain View, CA (US)

(72) Inventors: David Black, Mountain View, CA (US); Ryan Hickman, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/720,014

(22) Filed: May 22, 2015

Related U.S. Application Data

(63) Continuation of application No. 13/782,976, filed on Mar. 1, 2013, now Pat. No. 9,043,198.

(60) Provisional application No. 61/624,216, filed on Apr. 13, 2012.

(51) Int. Cl.  
*G06F 17/27* (2006.01)

(52) U.S. Cl.  
CPC .................................... *G06F 17/276* (2013.01)

(58) Field of Classification Search  
USPC ............................................................ 704/9  
See application file for complete search history.

(56) References Cited

U.S. PATENT DOCUMENTS

| | | |
|---|---|---|
| 6,377,965 B1 | 4/2002 | Hachamovitch et al. |
| 6,546,383 B1 | 4/2003 | Ogawa |
| 6,801,190 B1 | 10/2004 | Robinson et al. |
| 7,165,019 B1 | 1/2007 | Lee et al. |
| 7,657,423 B1 | 2/2010 | Harik et al. |
| 7,885,963 B2 | 2/2011 | Sanders |
| 7,890,526 B1 | 2/2011 | Brewer et al. |
| 8,064,702 B2 | 11/2011 | Markiewicz et al. |
| 8,214,347 B2 | 7/2012 | Matson |
| 8,441,454 B2 | 5/2013 | Longe et al. |
| 8,688,698 B1 | 4/2014 | Black et al. |
| 8,781,810 B2 | 7/2014 | Cancedda et al. |
| 2008/0091670 A1 | 4/2008 | Ismalon |
| 2009/0077037 A1 | 3/2009 | Wu et al. |

*Primary Examiner* — Charlotte M Baker  
(74) *Attorney, Agent, or Firm* — Fish & Richardson P.C.

(57) ABSTRACT

Methods, systems, and apparatus, including computer programs encoded on a computer storage medium, for automatic text suggestion are described. One of the methods includes receiving a text item including one or more terms; determining a plurality of text strings, each text string including a matching portion and one or more suffixes, wherein the matching portion matches the text item, and the one or more suffixes are located after the matching portion; ranking the one or more suffixes based on a credibility score and a frequency score of each suffix, the credibility score indicating an estimated credibility of a source of the text string including the suffix, the frequency score indicating an estimated frequency of appearance of the suffix; and providing a group of the one or more suffixes that includes a highest ranking suffix for display as a suggestion for completing a sentence starting from the text item.

20 Claims, 5 Drawing Sheets

402

404

The World Wide Web, abbreviated as WWW and commonly known as The Web, is a system of interlinked hypertext documents contained on the Internet. With a web browser, one can view web pages that may contain text, images, videos, and other multimedia and navigate between them by using hyperlinks.

The World Wide Web was invented ???

by Tim Berners-Lee
on December 25, 1990
at CERN

TEXT SUGGESTION

CROSS-REFERENCE TO RELATED APPLICATIONS

This application claims the benefit under 35 U.S.C. §120 of the filing date of U.S. patent application Ser. No. 13/782,976, for Text Suggestion, which was filed on Mar. 1, 2013, which claims the benefit under 35 U.S.C. §119(e) of the filing date of U.S. Patent Application No. 61/624,216, for Text Suggestion, which was filed on Apr. 13, 2012, both of which are incorporated here by reference.

BACKGROUND

This specification relates to word processing.

When a writer writes a word or a phrase in a word processor, the writer may desire that the word or phrase be automatically completed by the word processor. Various conventional word processors include "spell check" features. Some text entry systems have auto-complete functions to predicatively complete particular user-entered words.

SUMMARY

In general, one innovative aspect of the subject matter described in this specification can be embodied in methods that include the actions of receiving a text item, the text item including one or more terms; determining a plurality of text strings, each text string including a matching portion and one or more suffixes, wherein the matching portion matches the text item, and the one or more suffixes are located after the matching portion; ranking the one or more suffixes based on a credibility score of each suffix and a frequency score of each suffix, the credibility score of a suffix indicating an estimated credibility of a source of the text string including the suffix, the frequency score of a suffix indicating an estimated frequency of appearance of the suffix, wherein the frequency score of the suffix is calculated based at least in part on a function measuring partial overlaps between at least a portion of the suffix and one or more other suffixes; and providing a group of the one or more suffixes that includes a highest ranking suffix for display as a suggestion for completing a sentence starting from the text item. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The method includes: normalizing the received text item, including tokenizing and synonymizing the text item; and determining the text strings based on the normalized text item. Determining the plurality of test strings includes submitting at least a portion of the normalized text item as a search query, receiving an ordered group of search results, and selecting the plurality of text strings from the search results. The credibility score of the suffix is based on a corresponding position of a search result in the ordered group of search results. Each suffix comprises one or more words. Calculating the frequency score of the suffix includes using a probability tree having a plurality of nodes, each node corresponding to one or more words of the suffixes, wherein, in the probability tree, a first node is a child of a second node if the one or more words corresponding to the second node partially overlap the one or more words corresponding to the first node. Each node of the probability tree is associated with a probability value and calculating the frequency score of the suffix is based on the probability value associated with the node corresponding to the one or more words in the suffix. The method includes: calculating, using the function, the probability value associated with the node corresponding to the one or more words in the suffix based at least in part on child nodes of the node. Providing the group of the one or more suffixes for display includes automatically completing the sentence using the highest ranking suffix. Providing the group of the one or more suffixes for display includes providing the one or more suffixes for display as selection options.

Particular embodiments of the subject matter described in this specification can be implemented to realize one or more of the following advantages. A system can automatically provide suggestions that supplement an initial portion of text when the writer cannot remember subsequent content, e.g., a particular fact or idiom that completes the entered text. The suggestions can include words, phrases, or sentences. Thus, the system can allow the writer to continue writing without leaving an authoring environment to consult another source, e.g., dictionary, almanac, encyclopedia, or a search engine.

The system can provide automatic fact checking. When a writer writes content that includes a statement contradicting statements from a large number of resources, the system can prompt the writer to double-check the statement. For example, if the writer writes, "The World Wide Web was invented by Tim Berners-Lee and Robert Metcalfe," a word editor utilizing the automatic text suggestion techniques can highlight the word "Metcalfe" to alert the writer that there might be a factual error.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTIONS OF DRAWINGS

FIG. 4 illustrates an example user interface of an authoring environment implementing the automatic text suggestion techniques.

Like reference numbers and designations in the various drawings indicate like elements.

DETAILED DESCRIPTION

Figure 1:
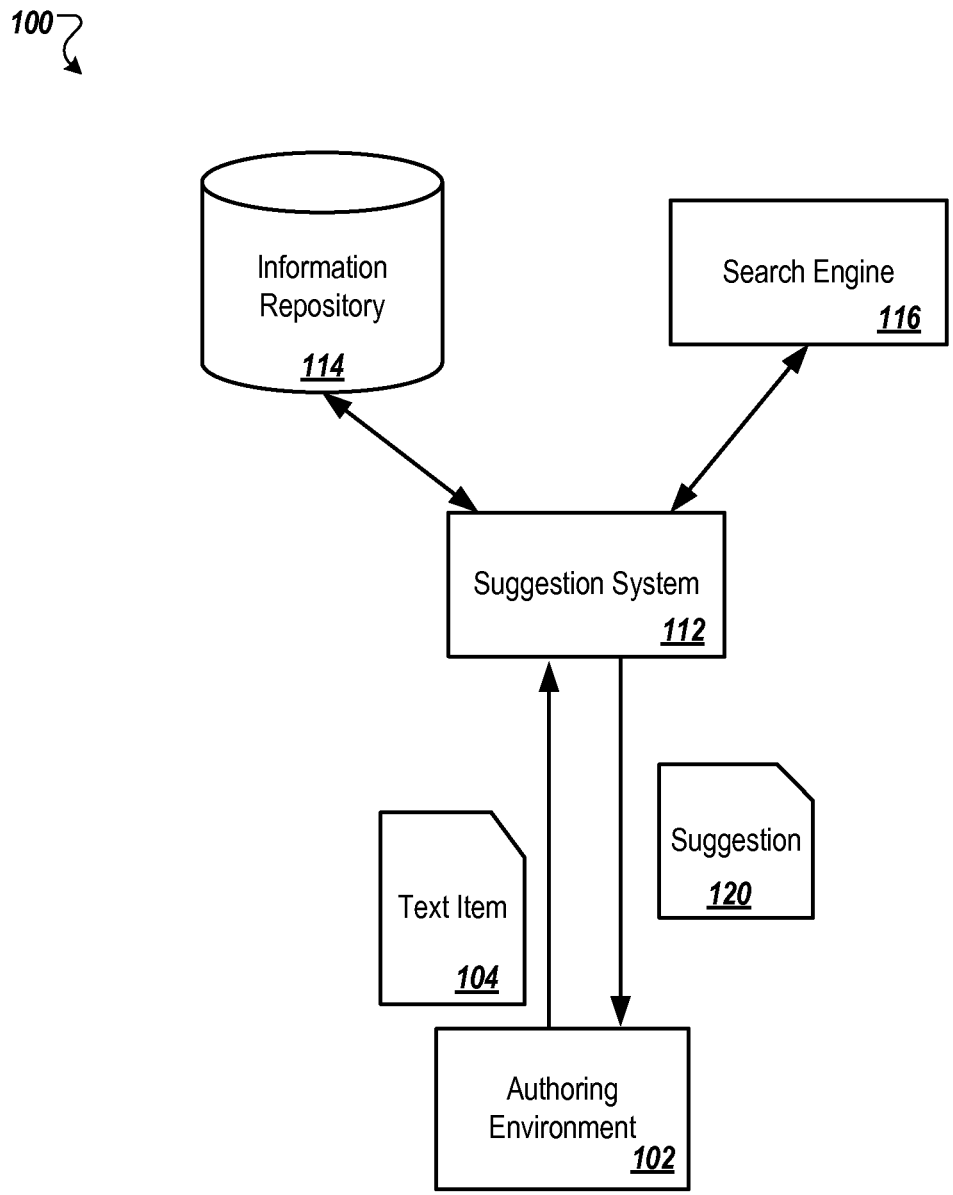
FIG. 1 is a block diagram illustrating an example system for providing text suggestions.

FIG. 1 is a block diagram illustrating an example system 100 implementing automatic text suggestion techniques. The system 100 includes an authoring environment 102 and a suggestion system 112. The suggestion system 112 provides text suggestion services for the authoring environment 102. In some implementations, the authoring environment 102 can be provided by a user device that is in communication with the suggestion system 112 through a communications network.

The authoring environment 102 includes a text editor for receiving textual inputs. The text editor can be an application program locally installed on the user device, or a web-based text editor provided by a web server. The text editor can be a word processing application. The authoring environment 102 receives and processes free-form text entries and text edits. The authoring environment 102 is also configured to receive an input indicating that a user is seeking a supplement to a text item 104 that has been entered in the text editor. Text item 104 can include one or more terms. Upon receiving the input, the authoring environment 102 sends a request to the suggestion system 112. The request includes the text item 104.

Upon receiving the request that includes the text item 104, the suggestion system 112 submits a query to a search engine 116. The query can include one or more terms of the text item 104 as query terms. In response, the suggestion system 112 receives one or more query results.

Each query result can include a text string. The suggestion system 112 can select from the query results one or more text strings. Each text string includes the portion of the text item 104 and one or more suffixes. Each suffix is a word or phrase that is located in a string after the portion of the text item 104. The suggestion system performs analysis on the suffixes in the selected text strings to determine one or more suggestions 120. The analysis can be performed to determine an estimated relevance between each suffix and the text item 104. The analysis includes determining a degree of overlap between multiple suffixes. Further details of the analysis will be described below. The suggestion system 112 can rank the suffixes based on an estimated relevance, and select one or more top ranked suffixes as suggestions 120. Suggestions 120 include one or more suffixes for supplementing the text item 104.

The suggestion system 112 provides the one or more suggestions 120 to the authoring environment 102. When one suggestion 120 is provided, the authoring environment 102 can supplement the text item 104 automatically using the suggestion 120. When multiple suggestions 120 are provided, the authoring environment 102 can provide a selection input for receiving a user selection of one of the suggestions, or a user rejection of all suggestions. In some implementations, the authoring environment 102 submits the user selection or rejection to the suggestion system 112, which can store the user selection or rejection in an information repository 114 as suggestion feedback history. In future analysis of text strings, the suggestion system 112 can use the suggestion feedback history to help identify suggestions, for example, by identifying a suggestion based on knowledge of which suggestion was most often selected by prior users.

The following example illustrates features and operations of system 100. The authoring environment 102 receives user input of text content, e.g., as typed by the user or pasted from another source. The text content can be a word, a phrase, a portion of a sentence, a sentence, a paragraph, or a document. For example, the authoring environment 102 receives the following text content: "According to most historians, the World Wide Web was invented," which has been input into the authoring environment 102.

The authoring environment 102 receives an input indicating that a user of the authoring environment 102 seeks information to supplement the text item 104 in the text content. Upon receiving the input, the authoring environment 102 sends a section of the text content (e.g., "World Wide Web was invented") to the suggestion system 112. In response, the suggestion system 112 returns three suggestions: "by Tim Berners-Lee," "on Dec. 25, 1990," and "at CERN." The authoring environment 102 can present the three suggestions in a selection user interface, e.g., a drop down or pop-up menu. Upon receiving a selection in the user interface, the authoring environment 102 can supplement the text content using the selected suggestion, such that the text content reads, for example, "According to most historians, the World Wide Web was invented by Tim Berners-Lee." The details of supplementing a text item are described below in reference to FIGS. 2A and 2B. The user can continue entering additional text content in the text editor, e.g., subsequent sentences.

Figure 2A:
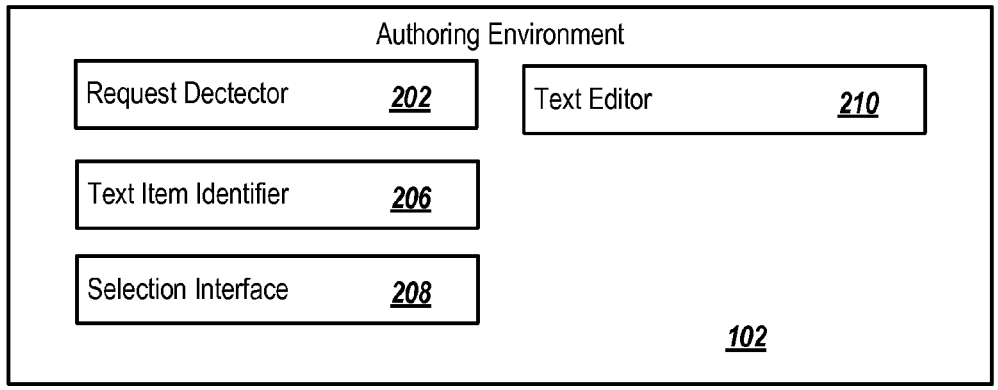
FIG. 2A is a block diagram illustrating an example architecture of an authoring environment implementing automatic text suggestion techniques.

FIG. 2A is a block diagram illustrating an example architecture of authoring environment 102 implementing automatic text suggestion techniques. The authoring environment 102 can include a text editor 210. The text editor 210 can be the text editor as described in reference to FIG. 1.

The authoring environment 102 includes a request detector 202. Request detector 202 is a software module that is configured to detect a user input requesting automatic text suggestion. The request detector 202 includes a plug-in, also known as an add-on, to the text editor 210. The plug-in includes a computer program configured to interact with the text editor 210, e.g., a word processing program or the server-supplied word processing program to provide text suggestion services. In some implementations, the request detector 202 uses one or more scripts that can be executed by a web browser.

In some implementations, the request detector 202 is configured to detect a pause in the user input, e.g., typing, before a punctuation mark is entered or a carriage return is pressed. For example, if a writer types a sentence or portion of a sentence, pauses before typing a punctuation mark such as a period ("."), and pauses for a threshold length of time (e.g., three seconds), the request detector 202 proceeds to submit a request to a suggestion system to supplement the text being typed by the writer.

In some implementations, the request detector 202 is configured to detect a specified sequence or combination of key strokes typed in by the writer as a trigger for text suggestion. The key strokes can include letters, numbers, or punctuation marks. For example, the request detector 202 can be configured to designate a string of three question marks ("???"), typed consecutively, as an input indicating a request for automatic text suggestion.

The request detector 202 can be configured to accept user defined key stroke sequences or combinations. For example, the request detector 202 can be configured to accept a sequence "????" or "\\\" or a key combination as an input for requesting automatic text suggestion. Thus, the input for requesting automatic text suggestion can be customized by the user, for example, if the user uses the default input, e.g., "???" for other purposes.

The authoring environment 102 includes a text item identifier 206. Text item identifier is a software module that identifies a text item to supplement from among multiple text items. In some implementations, the text item is a user selected portion of text content being edited in the authoring environment 102. In some implementations, the text item identifier 206 automatically detects a portion of the text content and designates the detected portion as the text item to be supplemented. For example, the text item identifier 206 can select the last n words typed by the writer (e.g., "World Wide Web was invented") when using the example of FIG. 1 and when n=5, the words after a last punctuation mark (e.g., "the World Wide Web was invented"), or the words from the beginning of the sentence currently being typed (e.g., "According to most historians, the World Wide Web was invented").

The authoring environment 102 includes a selection user interface 208 that is configured to provide for display multiple suggestions from the server. Further details on the selection user interface 208 will be described below in reference to FIG. 4.

Figure 2B:
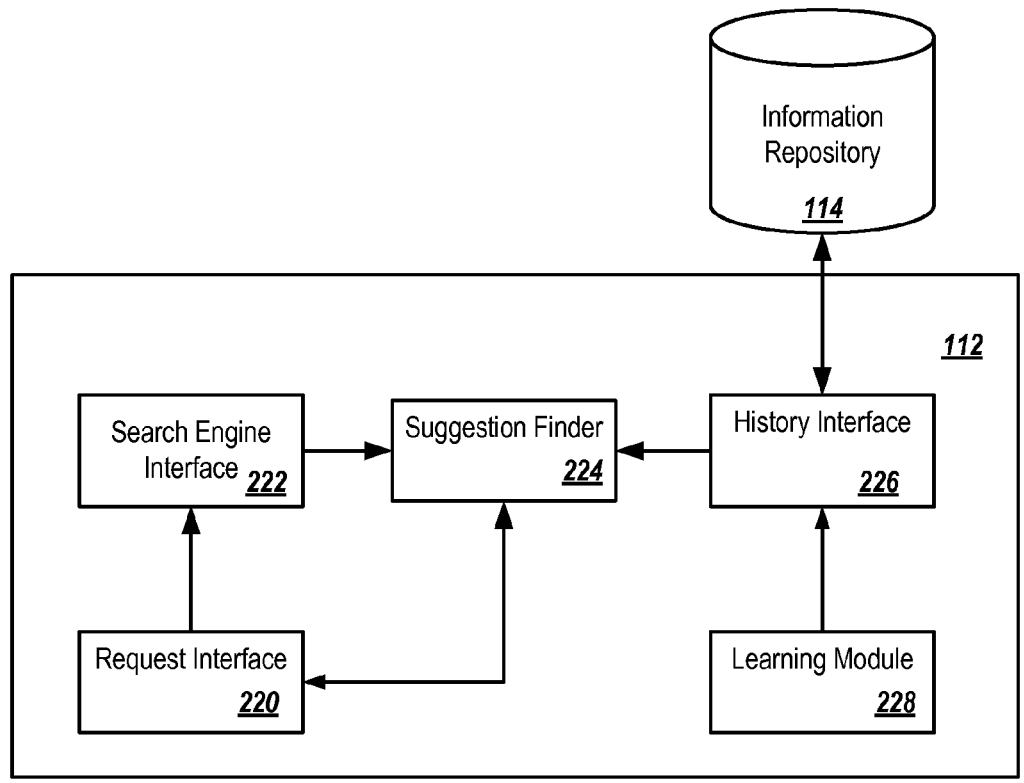
FIG. 2B is a block diagram illustrating an example architecture of a suggestion system.

FIG. 2B is a block diagram illustrating an example architecture of the suggestion system 112 implementing automatic text suggestion techniques. The suggestion system 112 includes request interface 220 that is configured to receive a request to supplement a text item from an authoring environment, e.g., the authoring environment 102 of FIG. 1 and FIG. 2A, and to provide suggestions for supplementing the text item to the authoring environment.

The suggestion system 112 includes a search engine interface 222 that can submit a query to a search engine, receive search results from the search engine, and select popular text strings from the search results. The search engine interface 222 is configured to submit at least a portion of the text item received by the request interface 220 to the search engine as search terms. The portion of the text item can be the text item excluding one or more words, e.g., articles "a" and "the." The portion of the text item can be normalized, e.g., tokenized or synonymized.

The search engine interface 222 is also configured to receive multiple search results from the search engine. The search results, as received, can be an ordered list of strings ranked by the search engine. Each search result can include a text string. Some examples of the text string included in the returned results are listed below:

(1) In the 1980's, the World Wide Web was invented by Tim Berners-Lee and Robert Cailliau . . .
(2) The World Wide Web was invented by Tim Berners-Lee . . .
(3) Tim Berners-Lee and Robert Cailliau invented the World Wide Web on Dec. 25, 1990 . . .
(4) The World Wide Web was first invented at CERN . . .

The search engine interface 222 can determine one or more strings from the search results. The determination can be based on a rank provided by the search engine. For example, the search engine interface 222 can select popular text strings from 30 top-ranked search results.

The suggestion system 112 includes a suggestion finder 224 that identifies one or more suggestions from the strings determined from the search results. The suggestion finder 224 can select text strings that include one or more suffixes to the text item, and exclude those strings where there are no suffixes to the text item. The suggestion finder 224 evaluates the text strings in reference to the text item to determine what suffixes are most likely to be helpful to the writer.

An example text string retrieved from search engine is: "In the 1980's, the World Wide Web was invented by Tim Berners-Lee and Robert Cailliau." The suggestion finder 224 identifies a matching portion of the text string (e.g., "the World Wide Web was invented") that matches the text item and a suffix that includes a non-matching string. The non-matching string is a string that does not semantically match the text item. In the examples above, the suffixes include "by Tim Berners-Lee and Robert Cailliau," "by Tim Berners-Lee," "on Dec. 25, 1990," and "at CERN."

The suggestion finder 224 provides at least one of the suffixes as a suggestion. If there are multiple suffixes, the suggestion finder 224 ranks the suffixes and provides the suffixes as suggestions according to the ranking.

The suggestion finder 224 ranks the suffixes based on a credibility score and a frequency score calculated for each suffix. The credibility score of a suffix includes a value that indicates an estimated credibility of a source of the text string including the suffix. The source can be a web site the content of which includes the text string including the suffix. The frequency score of a suffix is a value that indicates an estimated frequency of appearance of the suffix among the search results returned from the search engine. The suggestion finder 224 can calculate a likelihood that the suffix, if suggested to a user, will be selected by the user to supplement the text item based on the credibility score and the frequency score of the suffix.

The suggestion finder 224 can calculate the credibility score of a suffix based on a position of the text string including the suffix among the list of ranked search results. Additionally or alternatively, the suggestion finder 224 can calculate the credibility score based on a length of the suffix, a past selection history of the suffix, or any combination of the above. In some implementations, the suggestion finder 224 calculates a value L of a suffix (e.g., "by Tim Berners-Lee and Robert Cailliau in Europe") using the length of the string. The length can be measured in a count of bytes, a count of characters, a count of words, or a combination of the above. The value L includes a normalized length. The value L can be a component of the credibility score.

The suggestion finder 224 can calculate the frequency score of a suffix based on a function measuring partial overlaps between at least a portion of the suffix and one or more other suffixes. Initially, the suggestion finder 224 can assign a base frequency score for a suffix. The suggestion finder 224 can determine the base frequency score based on a number of times the suffix appears in the search results.

The suggestion finder 224 can calculate the frequency score by adjusting the base frequency score based on overlaps. If a first suffix overlaps a second suffix, the suggestion finder 224 can increase the base frequency score of the first suffix and the second suffix. A first suffix overlaps a second suffix when at least a portion of the first suffix appears in the second suffix. For example, a first suffix "Tim Berners-Lee" and a second suffix "Tim Berners-Lee and Robert Cailliau" overlap each other. Accordingly, the suggestion finder 224 adjusts the base frequency scores of the first suffix "Tim Berners-Lee," or the second suffix "Tim Berners-Lee and Robert Cailliau," or both the first suffix and the second suffix, upwards.

Suggestion system 112 includes a history interface 226 that provides an interface to an information repository 114. The information repository 114 can store history learned from past selections of suggestions by multiple users, and the frequency of the user selections. For example, the information repository 114 stores information indicating that the suggestion "by Tim Berners-Lee" has been selected as a supplement to a text item "World Wide Web was invented" x number of times, whereas the suggestion "on Dec. 25, 1990" has been selected y number of times. The suggestion finder 224 can use the stored information, including the values x and y, to determine whether to suggest "by Tim Berners-Lee" or "on Dec. 25, 1990," or both, and in what order, in response to a next request. In some implementations, the suggestion that has been selected most frequently in the past is ranked highest as a suggestion in response to the next request. A learning module 228 of the suggestion system 112 collects user selections and provides the user selections for storage in the information repository 114 through the history interface 226. The data in the history can be aggregated or otherwise anonymized to remove user-specific information.

In some implementations, the request interface 220 can be configured to receive a "fact check" request that seeks to identify potential inaccuracies in particular input text, e.g., a particular sentence. A potential inaccuracy can be identified based on a statement that contradicts statements from multiple sources. For example, the request interface 220 can receive the following text item and a fact check request: "The World Wide Web was invented by Tim Berners-Lee and Robert Metcalfe." The section "Tim Berners-Lee and Robert Metcalfe" is highlighted or otherwise marked for fact checking. The fact check request can be generated automatically or can be triggered by a user input.

The suggestion finder 224 can determine that none of the most popular text strings retrieved through the search engine interface 222 contains a first portion that matches "The World Wide Web was invented" and a second portion that matches "by Tim Berners-Lee and Robert Metcalfe." Rather, some popular text strings contain a second portion that reads "by Tim Berners-Lee and Robert Cailliau," which is similar to the received sentence. The suggestion finder 224 can provide a hint through the request interface 220, for example, in the form of a popup window in an authoring environment. The popup window can contain a prompt "Did you mean 'by Tim Berners-Lee and Robert Cailliau'?" where the potential factual conflict "Cailliau" is highlighted or otherwise emphasized. The writer can then choose to keep or change the entered text in light of the prompt.

Figure 3:
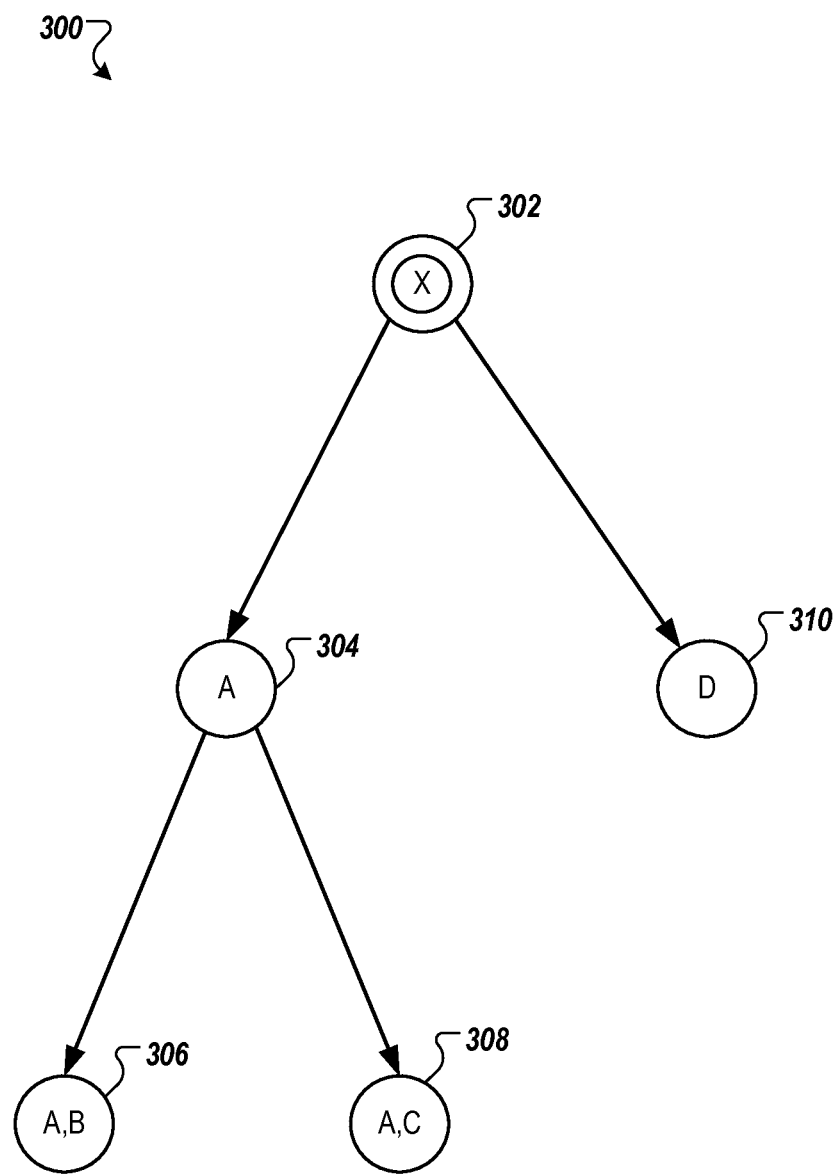
FIG. 3 illustrates an example probability tree for providing text suggestions.

FIG. 3 illustrates an example probability tree 300 for providing text suggestions. A system providing text suggestions can use probability tree 300 to calculate a frequency score for each suffix.

The probability tree 300 can include a root 302. The root 302 corresponds to a text item based on which the system provides text suggestions. The probability tree 300 includes nodes 304, 306, 308, and 310. Each node corresponds to a different suffix. Each suffix can be a word or phrase that appears in one or more text strings in a search result set that corresponds to the text item. In the probability tree 300, a first node is a child of a second node if the one or more words corresponding to the second node partially overlap the one or more words corresponding to the first node. Specifically, in some implementations, a first node is a child of a second node if every word of the second node appears in the first node, and the first node includes at least one word that does not appear in the second node. For example, the nodes 306 and 308, corresponding to suffixes "A, B" and "A, C," respectively, are children nodes of the node 304, which corresponds to suffix "A."

Each of the nodes 304, 306, 308, and 310 can be associated with a probability value. The system can calculate an initial probability value of a node based on a number of times the suffix represented by the node appears in the search result set. In addition, the system can adjust the initial probability value of a node based on the probability value of a child node of the node. If the node has a child node that has a non-zero probability value, the system can increase the probability value of the node by an amount that corresponds to the non-zero probability value of the child node.

For example, if a suffix "A," as represented by the node 304 in the probability tree 300 and a suffix "B," as represented by the node 310 in the probability tree 300, both appear a certain number times in the search result set, the system can assign a same initial probability value to the node 304 and the node 310. The system can determine that the node 304 has more child nodes than the node 310. Accordingly, the system can assign a higher probability value to the node 304 than to the node 310, due to the child nodes 306 and 308 of the node 304. The system can then determine the frequency scores of each of the suffixes "A," "A, B," "A, C," and "D" based on the probability value of the respective nodes 304, 306, 308, and 310.

FIG. 4 illustrates an example user interface of an authoring environment implementing the automatic text suggestion techniques. The example user interface can be implemented on a client computer that a user uses to enter and edit text.

A user interface window 404 of an authoring environment 402 is displayed on a display device. For simplicity, controls of the authoring environment 402 are omitted. The authoring environment 402 can be the authoring environment 102 as described above in reference to FIG. 1. The user interface window 404 includes a text area into which a writer can input text content. The authoring environment 402 receives part of a sentence, e.g., "The World Wide Web was invented," input by the writer. The authoring environment 402 then receives an input trigger (e.g., a string "???") indicating that the writer seeks suggestion to complete the sentence. The input trigger can include the absence of input, e.g., a lack of a particular input for a specified amount of time. Upon receiving the input, the authoring environment 402 feeds the part of the sentence that is already written ("The World Wide Web was invented") to a suggestion system and receives three suggestions in response ("by Tim Berners-Lee," "on Dec. 25, 1990," and "at CERN").

The three suggestions are displayed in a selection interface 406, and sorted based on relation scores calculated for the suggestions. The writer can select any of the three suggestions, or ignore the suggestions and continue writing the sentence. The selected suggestion can replace the input "???" in the sentence. In some implementations, the authoring environment 102 receives only one suggestion. In such cases, the authoring environment 102 can automatically replace the input "???" in the sentence with the suggestion without providing the selection interface 406.

In some implementations, an authoring environment, e.g., the authoring environment 102 or 104, can be configured to operate in batch mode. In batch mode, the authoring environment withholds submitting an input to a suggestion system until the authoring environment receives a confirmation. Thus, multiple text suggestion requests can be made substantially simultaneously. For example, a writer types a string "???" whenever the writer is uncertain about a fact. The authoring environment creates and stores a request each time the authoring environment receives the string "???." The authoring environment submits the stored request to a suggestion system (e.g., a server device) in batch. The suggestion system can process the requests serially, for example, by presenting a second suggestion for supplementing a second text item after the writer has selected a first suggestion for supplementing a first text item. Alternatively or additionally, the server can process the sentences in parallel, for example, by presenting multiple suggestions for multiple text items substantially simultaneously in a user interface window, e.g., user interface window 404.

Figure 5:
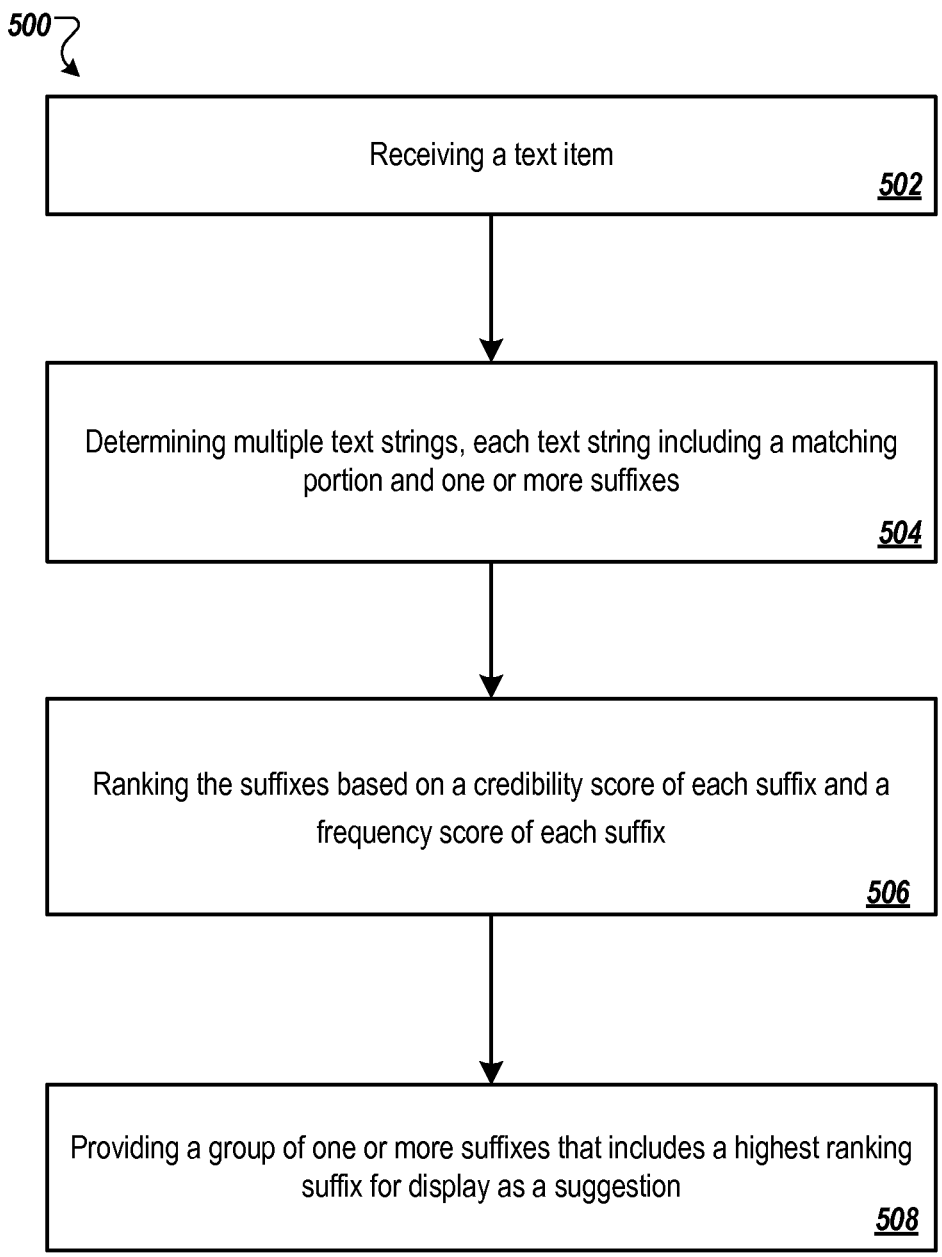
FIG. 5 is a flowchart illustrating an example process of automatic text suggestion.

FIG. 5 is a flowchart illustrating an example process 500 of automatic text suggestion. For convenience, the process 500 will be described with respect to a system that performs the process 500. For example, a system having one or more computing devices, e.g., the suggestion system 112 as described in reference to FIGS. 1, 2A, and 2B, can perform the operations of process 500.

The system receives (502) a text item. The text item can include one or more words or phrases located at a beginning of a sentence. The system can normalize the text item, including tokenizing and synonymizing the text item.

The system determines (504) multiple text strings. Each text string includes a matching portion and one or more suffixes. The matching portion matches the text item. The one or more suffixes are located after the matching portion. Each suffix can include one or more words. The system can determine the text strings based on the normalized text item. To determine the text strings, the system can submit the normalized text item to a search engine as a search query. The system can receive a group of ordered search results returned by a search engine. The system can then determine the text strings from the received search results.

The system ranks (506) the suffixes based on a credibility score of each suffix and a frequency score of each suffix. The credibility score of a suffix indicates an estimated credibility of a source of the text string including the suffix. The frequency score of a suffix indicates an estimated frequency of appearance of the suffix. The frequency score of the suffix is calculated based at least in part on a function measuring partial overlaps between at least a portion of the suffix and one or more other suffixes.

The system can determine the credibility score of the suffix based on a position of the text string including the suffix among the group of ordered search results returned by a search engine.

The system can calculate the frequency score of a suffix using a probability tree, e.g., the probability tree 300 of FIG. 3. The probability tree has multiple of nodes, each node corresponding to one or more words of the suffixes. In the probability tree, a first node is a child of a second node if the one or more words corresponding to the second node partially overlap the one or more words corresponding to the first node. Each node of the probability tree is associated with a probability value. Calculating the frequency score of a suffix is based on the probability value associated with the node corresponding to the one or more words in the suffix. The system can calculate, using a function, the probability value associated with a node corresponding to the one or more words in a suffix based at least in part on children nodes of the node.

The system provides (508) a group of one or more suffixes that includes a highest ranking suffix for display as a suggestion for completing a sentence starting from the text item. In some implementations, the system can automatically complete a sentence starting from the received text item using the highest ranking suffix. In some implementations, the system can provide the one or more suffixes for display as selection options. The system can receive a user input selecting a suffix, and then complete the sentence using the selected suffix.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, a personal computer system, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, a network routing device, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or a routing device, e.g., a network router, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs executing on the respective computers and having a client-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

An electronic document (which for brevity will simply be referred to as a document) can, but need not, correspond to a file. A document can be stored in a portion of a file that holds other documents, in a single file dedicated to the document in question, or in multiple coordinated files.

While this specification contains many specific implementation details, these should not be construed as limitations on the scope of any inventions or of what can be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:
1. A method comprising:
 receiving a text item input by a user to an authoring environment presented on a user device, the text item including one or more words forming a beginning portion of a sentence;
 determining, by operation of a system having one or more computers, a plurality of text strings using text included in search results received from a search engine, each text string including a matching portion and one or more suffixes, wherein the matching portion matches the text item, and wherein each respective suffix is located after the matching portion;
 ranking, by operation of the system, the one or more suffixes based on a credibility score calculated for each suffix and a frequency score calculated for each suffix, wherein the credibility score of a particular suffix indicates an estimated credibility of a source of the text string including the suffix, the frequency score of a particular suffix indicates an estimated frequency of appearance of the suffix; and
 providing one or more of the suffixes based on the ranking for display on the user device as one or more corresponding suggestions for completing the sentence begun by the user input to the authoring environment.

2. The method of claim 1, wherein providing one or more of the suffixes for display includes providing the one or more suffixes for display as selection options.

3. The method of claim 1, comprising:
normalizing the received text item, including tokenizing and synonymizing the text item; and
determining the text strings based on the normalized text item.

4. The method of claim 3, wherein determining the plurality of test strings includes submitting at least a portion of the normalized text item as a search query to the search engine, receiving an ordered group of search results, and selecting the plurality of text strings from the search results.

5. The method of claim 4, wherein the credibility score of the suffix is based on a corresponding position of a search result in the ordered group of search results.

6. The method of claim 1, wherein the frequency score of each suffix is calculated based at least in part on a function measuring partial overlaps between at least a portion of the suffix and one or more other suffixes.

7. The method of claim 1, wherein calculating the frequency score of a particular suffix includes using a probability tree having a plurality of nodes, each node corresponding to one or more words of the suffixes, wherein, in the probability tree, a first node is a child of a second node if the one or more words corresponding to the second node partially overlap the one or more words corresponding to the first node.

8. The method of claim 7, wherein each node of the probability tree is associated with a probability value and calculating the frequency score of the suffix is based on the probability value associated with the node corresponding to the one or more words in the suffix.

9. The method of claim 8, comprising:
calculating, using the function, the probability value associated with the node corresponding to the one or more words in the suffix based at least in part on child nodes of the node.

10. The method of claim 1, wherein providing one or more of the suffixes for display includes automatically completing the sentence using the highest ranking suffix.

11. A system comprising:
one or more processors configured to perform operations comprising:
receiving a text item input by a user to an authoring environment presented on a user device, the text item including one or more words forming a beginning portion of a sentence;
determining, by operation of the system, a plurality of text strings using text included in search results received from a search engine, each text string including a matching portion and one or more suffixes, wherein the matching portion matches the text item, and wherein each respective suffix is located after the matching portion;
ranking, by operation of the system, the one or more suffixes based on a credibility score calculated for each suffix and a frequency score calculated for each suffix, wherein the credibility score of a particular suffix indicates an estimated credibility of a source of the text string including the suffix, the frequency score of a particular suffix indicates an estimated frequency of appearance of the suffix; and
providing one or more of the suffixes based on the ranking for display on the user device as one or more corresponding suggestions for completing the sentence begun by the user input to the authoring environment.

12. The system of claim 11, wherein providing one or more of the suffixes for display includes automatically completing the sentence using the highest ranking suffix.

13. The system of claim 11, configured to perform operations comprising:
normalizing the received text item, including tokenizing and synonymizing the text item; and
determining the text strings based on the normalized text item.

14. The system of claim 13, wherein determining the plurality of test strings includes submitting at least a portion of the normalized text item as a search query, receiving an ordered group of search results, and selecting the plurality of text strings from the search results.

15. The system of claim 14, wherein the credibility score of the suffix is based on a corresponding position of a search result in the ordered group of search results.

16. The system of claim 11, wherein the frequency score of each suffix is calculated based at least in part on a function measuring partial overlaps between at least a portion of the suffix and one or more other suffixes.

17. The system of claim 11, wherein calculating the frequency score of a particular suffix includes using a probability tree having a plurality of nodes, each node corresponding to one or more words of the suffixes, wherein, in the probability tree, a first node is a child of a second node if the one or more words corresponding to the second node partially overlap the one or more words corresponding to the first node.

18. The system of claim 17, wherein each node of the probability tree is associated with a probability value and calculating the frequency score of the suffix is based on the probability value associated with the node corresponding to the one or more words in the suffix.

19. The system of claim 18, configured to perform operations comprising:
calculating, using the function, the probability value associated with the node corresponding to the one or more words in the suffix based at least in part on child nodes of the node.

20. A non-transitory storage device storing computer instructions operable to cause one or more processors to perform operations comprising:
receiving a text item input by a user to an authoring environment presented on a user device, the text item including one or more words forming a beginning portion of a sentence;
determining a plurality of text strings using text included in search results received from a search engine, each text string including a matching portion and one or more suffixes, wherein the matching portion matches the text item, and wherein each respective suffix is located after the matching portion;
ranking the one or more suffixes based on a credibility score calculated for each suffix and a frequency score calculated for each suffix, wherein the credibility score of a particular suffix indicates an estimated credibility of a source of the text string including the suffix, the frequency score of a particular suffix indicates an estimated frequency of appearance of the suffix; and
providing one or more of the suffixes based on the ranking for display on the user device as one or more corresponding suggestions for completing the sentence begun by the user input to the authoring environment.

* * * * *